United States Patent
Iizuka et al.

(10) Patent No.: US 6,954,222 B2
(45) Date of Patent: Oct. 11, 2005

(54) MANUFACTURING METHOD OF SCANNING OPTICAL SYSTEM

(75) Inventors: Takashi Iizuka, Saitama-ken (JP); Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 211 days.

(21) Appl. No.: 10/643,900

(22) Filed: Aug. 20, 2003

(65) Prior Publication Data

US 2004/0036974 A1 Feb. 26, 2004

(30) Foreign Application Priority Data

Aug. 21, 2002 (JP) ........................................ 2002-240410

(51) Int. Cl.[7] .............................................. B41J 27/00
(52) U.S. Cl. ...................................... 347/244; 347/258
(58) Field of Search ........................ 347/230, 243–244, 347/258–259; 359/196, 215

(56) References Cited

U.S. PATENT DOCUMENTS

| | | | |
|---|---|---|---|
| 4,993,792 A | 2/1991 | Minoura | 359/206 |
| 5,191,463 A | 3/1993 | Minoura | 359/218 |
| 5,646,767 A | 7/1997 | Iima et al. | 359/206 |
| 5,680,242 A | * 10/1997 | Ando | 359/196 |
| 5,841,463 A | * 11/1998 | Debesis et al. | 347/242 |
| 6,667,757 B2 | * 12/2003 | Yamaguchi et al. | 347/259 |

FOREIGN PATENT DOCUMENTS

JP          5-346553          12/1993

* cited by examiner

*Primary Examiner*—Hai Pham
(74) *Attorney, Agent, or Firm*—Greenblum & Bernstein, P.L.C.

(57) ABSTRACT

A laser beam emitted by a light source is incident on one of reflecting surfaces of a polygon mirror. The laser beam reflected by the reflecting surface is dynamically deflected in a main scanning direction due to the revolution of the polygon mirror and enters a scanning lens. The first surface of the scanning lens is provided with anti-reflection coating only when the following condition (1) is satisfied:

$$H/2 > |2\beta D(D-Rz_1)/Rz_1| \quad (1)$$

where "H" denotes the width of each reflecting surface of the polygon mirror in a auxiliary scanning direction, "$\beta$" denotes the incident angle [radian] of the laser beam on the reflecting surface of the polygon mirror in the auxiliary scanning direction, "D" denotes the distance between the reflecting surface and the first surface of the scanning lens, and "$Rz_1$" denotes the curvature radius of the first surface in an auxiliary scanning cross section.

16 Claims, 6 Drawing Sheets

MANUFACTURING METHOD OF SCANNING OPTICAL SYSTEM

BACKGROUND OF THE INVENTION

The present invention relates to a method for manufacturing a scanning optical system which scans a laser beam emitted from a light source by reflecting the beam with reflecting surfaces of a polygon mirror revolving in a fixed direction and converging the reflected beam on a surface to be scanned (hereinafter, referred to as a target surface) by an imaging optical system.

Scanning optical systems are widely used in electrophotographic laser beam printers, digital photocopiers, laser fax machines, laser plotters, and other similar apparatuses for scanning the surface of a photosensitive body (e.g., a photoconductive drum) to scan the target surface with a modulated beam.

Specifically, the scanning optical system dynamically deflects the modulated laser beam, which is ON-OFF modulated according to image information, using the polygon mirror and converges the dynamically deflected laser beam into a beam spot on the target surface by use of an imaging optical system. With the mechanism, the scanning optical system scans the beam spot on the target surface in a main scanning direction at a constant speed. At the same time, the target surface is moved in an auxiliary scanning direction which is perpendicular to the main scanning direction and thereby a two-dimensional image composed of a plurality of dots is formed on the target surface.

Incidentally, in the design of scanning optical systems, how to remove "ghosts" caused by unwanted reflection on surfaces of optical elements of the system is an important matter. Such unwanted reflection can occur, for example, on each surface of each lens forming the aforementioned imaging optical system. Reflected light (ghost light) caused by reflection of part of the laser beam incident upon a lens surface returns in a particular direction that is determined depending on the direction of the laser beam axis and the incident angle of the laser beam relative to the lens surface. If a reflecting surface of the polygon mirror exists in the returning direction of the ghost light, the ghost light is reflected again by the reflecting surface.

If the ghost light from the lens surface is incident upon a reflecting surface of the polygon mirror that is reflecting/deflecting an incident laser beam from the light source, the ghost light is directed in a direction almost opposite to the propagating direction of the incident laser beam, by which the ghost light does not reenter the imaging optical system.

On the other hand, if the ghost light is incident upon a reflecting surface of the polygon mirror that is adjacent to the reflecting surface reflecting/deflecting the incident laser beam from the light source, there is a possibility that the ghost light reflected by the adjacent reflecting surface reenters the imaging optical system and partially reaches the photosensitive body (e.g., photoconductive drum). In such a case, unevenness exposure is caused by the ghost light, which deteriorates the total imaging forming performance of the scanning optical system.

It is possible to remove such ghosts if the reflectivity can be reduced to 0 at all surfaces of the lenses of the imaging optical system. However, reducing the reflectivity closer to 0 requires a larger number of layers for an anti-reflection coating and it drives up the manufacturing costs. Further, in cases of plastic lenses which are recently used for reducing manufacturing costs and for realizing aspherical lens surfaces, adhesion of the anti-reflection coating to the plastic lenses tends to be weaker than that to glass lenses. Therefore, it is undesirable to provide the anti-reflection coating to all lens surfaces of the imaging optical system.

SUMMARY OF THE INVENTION

The present invention is advantageous in that an improved manufacturing method of a scanning optical system is provided. According to the method, the reduction of the ghosts (caused by the reflection on lens surfaces of the imaging optical system) can be reduced at a low cost.

According to a first aspect of the present invention, there is provided a manufacturing method of a scanning optical system including a light source for emitting a laser beam, a polygon mirror for scanning the laser beam in a main scanning direction by reflecting the laser beam with reflecting surfaces formed on its lateral faces while revolving around its central axis in a fixed direction, and an imaging optical system including a plurality of lens surfaces for converging the laser beam reflected and scanned by the polygon mirror on a target surface, the method has the steps of determining whether a following condition (1) is satisfied:

$$H/2 > |2\beta D(D-Rz_1)/Rz_1| \quad (1)$$

where, "H" denotes a width of each reflecting surface of the polygon mirror in an auxiliary scanning direction perpendicular to the main scanning direction, "$\beta$" denotes an incident angle [radian] of the laser beam on the reflecting surface of the polygon mirror in the auxiliary scanning direction, "D" denotes a distance between the reflecting surface of the polygon mirror and the first lens surface (the first lens surface being a reference surface and the distance measured along a direction from the first lens surface to the reflecting surface of the polygon mirror being represented by a negative value (D<0)), and "$Rz_1$" denotes a radius of curvature of the first lens surface in the auxiliary scanning direction, and forming anti-reflection coating on a first lens surface existing at the front end of the imaging optical system only when the condition is satisfied.

When the condition (1) is satisfied, if part of the laser beam reflected by a reflecting surface of the polygon mirror and incident on the imaging optical system is reflected by the first lens surface, ghost light caused by the reflection reaches one of the reflecting surfaces of the polygon mirror and is reflected by the reflecting surface. In this case, there is a high possibility that the ghost light reflected by the reflecting surface reenters the imaging optical system and exposes the scan target surface through the imaging optical system, therefore, the anti-reflection coating is provided to the first lens surface, by which the occurrence of the ghost caused by the reflection on the first lens surface can be prevented. On the other hand, when the condition (1) is not satisfied, the ghost light caused by the reflection on the first lens surface passes above or below the polygon mirror and there is no possibility of exposure of the scan target surface. Therefore, the anti-reflection coating on the first lens surface is omitted in this case, by which manufacturing costs of the scanning optical system can be reduced.

By providing the anti-reflection coating to the first lens surface when the following condition (2), in addition to the condition (1), is satisfied, useless and wasteful anti-reflection coating can be avoided more effectively and the manufacturing costs can be reduced further. The condition (2) is as follows:

$$|W| \leq f[(4\pi/P) + \alpha + (2a(Ry_1-D)/Ry_1)] \quad (2)$$

where $|a| \leq W/f$, "W" denotes a maximum image height in a scanning range on the scan target surface, "f" denotes a total focal length of the imaging optical system, "P" denotes the number of the reflecting surfaces of the polygon mirror, "α" denotes an angle [radian] of the laser beam incident on the polygon mirror relative to an optical axis of the imaging optical system measured in the main scanning direction, "a" denotes a swing angle of the laser beam reflected by the polygon mirror relative to the optical axis of the imaging optical system measured in the main scanning direction [radian], and "$Ry_1$" denotes a curvature radius of the first lens surface in the main scanning direction.

When the condition (2) is satisfied, ghost light from the first lens surface is reflected by an "adjacent reflecting surface" of the polygon mirror (reflecting surface adjacent to a reflecting surface that reflected the laser beam from the light source), reenters and passes through the imaging optical system, and exposes a scanning range on the scan target surface. On the other hand, when the condition (2) is not satisfied, the ghost light reaches a reflecting surface other than the adjacent reflecting surface, or even if the ghost light is reflected by the adjacent reflecting surface, the ghost light is incident on an area of the scan target surface outside the scanning range. Therefore, by providing the anti-reflection coating to the first lens surface only when the condition (2) is satisfied, the provision of the anti-reflection coating can be minimized while securely preventing the ghost light which causes ghosts in printouts.

A manufacturing method of a scanning optical system in accordance with a second aspect of the present invention considers a second lens surface of the imaging optical system existing next to the first lens surface at the front end of the imaging optical system, in which the anti-reflection coating is provided to the second lens surface only when the following condition (3) is satisfied:

$$H/2 > |\beta D(D-Lz)/Lz| \quad (3)$$

where $Lz = Rz_1 Rz_2 D/(2NRz_1 D - 2(N-1)Rz_2 D - Rz_1 Rz_2)$, "H" denotes a width of each reflecting surface of the polygon mirror in a auxiliary scanning direction perpendicular to the main scanning direction, "β" denotes an incident angle of the laser beam on the reflecting surface of the polygon mirror in the auxiliary scanning direction [radian], "D" denotes a distance between the reflecting surface of the polygon mirror and the first lens surface (the first lens surface, which is closest to the polygon mirror, being a reference surface and the distance measured along a direction from the first lens surface to the reflecting surface of the polygon mirror being represented by a negative value (D<0)), "$Rz_1$" denotes a curvature radius of the first lens surface in the auxiliary scanning direction, "$Rz_2$" denotes a curvature radius of the second lens surface in the auxiliary scanning direction, and "N" denotes a refractive index of a medium between the first lens surface and the second lens surface for the laser beam, When the condition (3) is satisfied, if part of the laser beam reflected by a reflecting surface of the polygon mirror and incident on the imaging optical system is reflected by the second lens surface, ghost light caused by the reflection reaches one of the reflecting surfaces of the polygon mirror and is reflected by the reflecting surface. In this case, there is a high possibility that the ghost light reflected by the reflecting surface reenters the imaging optical system and exposes the scan target surface through the imaging optical system, therefore, the anti-reflection coating is provided to the second lens surface, by which the occurrence of the ghost caused by the reflection on the second lens surface can be prevented. On the other hand, when the condition (3) is not satisfied, the ghost light caused by the reflection on the second lens surface passes above or below the polygon mirror and there is no possibility of exposure of the scan target surface. Therefore, the anti-reflection coating on the second lens surface is omitted in this case, by which manufacturing costs of the scanning optical system can be reduced.

By providing the anti-reflection coating to the second lens surface only when the following condition (4), in addition to the condition (3), is satisfied, useless and wasteful anti-reflection coating can be avoided more effectively and the manufacturing costs can be reduced further:

$$|W| \leq f[(4\pi/P) + \alpha + (a(Ly-D)/Ly)] \quad (4)$$

where $|a| \leq W/f$, $Ly = Ry_1 Ry_2 D/(2NRy_1 D - 2(N-1)Ry_2 D - Ry_1 Ry_2)$, "W" denotes a maximum image height in a scanning range on the scan target surface, "f" denotes a total focal length of the imaging optical system, "P" denotes the number of the reflecting surfaces of the polygon mirror, "α" denotes an angle of the laser beam incident on the polygon mirror relative to an optical axis of the imaging optical system measured in the main scanning direction [radian], "a" denotes a swing angle of the laser beam reflected by the polygon mirror relative to the optical axis of the imaging optical system measured in the main scanning direction [radian], "$Ry_1$" denotes a curvature radius of the first lens surface in the main scanning direction, and "$Ry_2$" denotes a curvature radius of the second lens surface in the main scanning direction. When the condition (4) is satisfied, ghost light from the second lens surface is reflected by an "adjacent reflecting surface" of the polygon mirror (reflecting surface adjacent to a reflecting surface that reflected the laser beam from the light source), reenters and passes through the imaging optical system, and exposes the scanning range on the scan target surface. On the other hand, when the condition (4) is not satisfied, the ghost light reaches a reflecting surface other than the adjacent reflecting surface, or even if the ghost light is reflected by the adjacent reflecting surface, the ghost light is incident on an area of the scan target surface outside the scanning range. Therefore, by providing the anti-reflection coating to the second lens surface only when the condition (4) is satisfied, the provision of the anti-reflection coating can be minimized while securely preventing the ghost light which causes ghosts in printouts.

BRIEF DESCRIPTION OF THE ACCOMPANYING DRAWINGS

DESCRIPTION OF THE PREFERRED EMBODIMENTS

Figure 1:
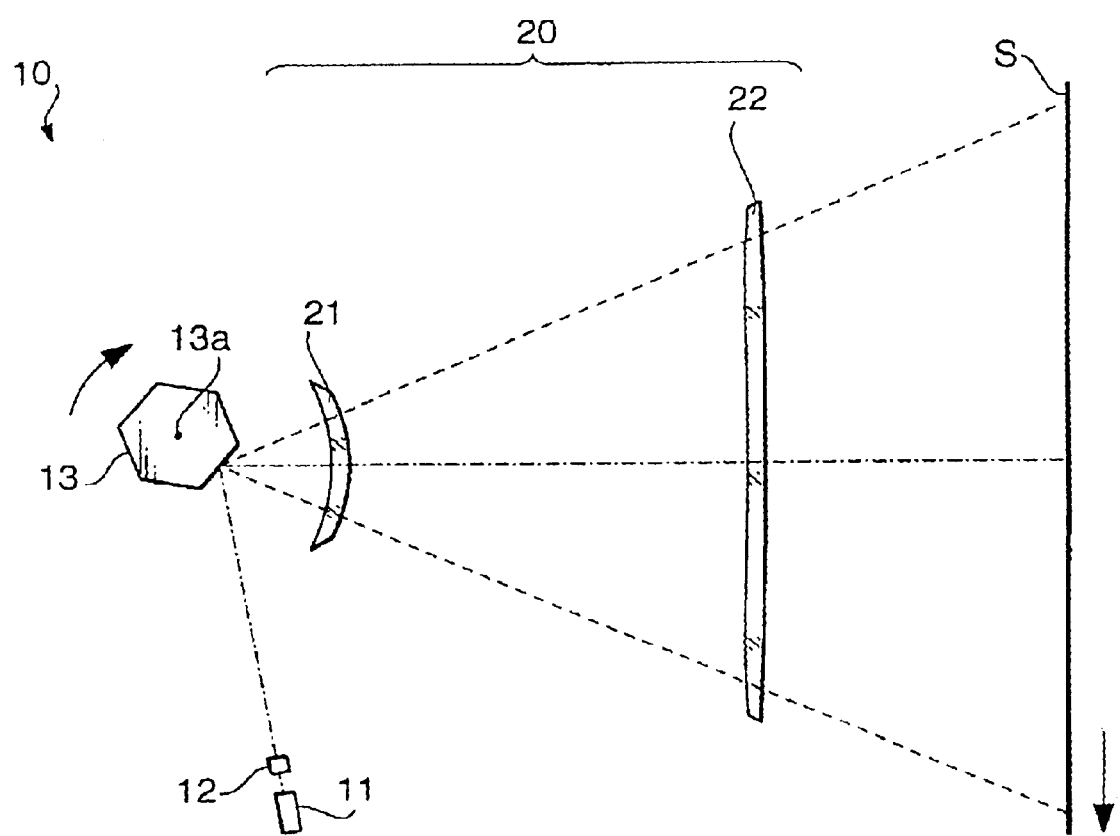
FIG. 1 is a cross-sectional view showing the basic composition of a scanning optical system which is manufactured by a manufacturing method in accordance with an embodiment of the invention.

Referring now to the drawings, a description will be given in detail of preferred embodiments in accordance with the present invention.

FIG. 1 is a cross-sectional view showing a basic composition of a scanning optical system which is manufactured following a manufacturing method in accordance with the present invention. The scanning optical system 10 of FIG. 1 includes a laser light source 11 for emitting a laser beam, a cylindrical lens 12 for converging the laser beam from the laser light source 11, a polygon mirror 13 in the shape of a regular polygonal prism having lateral faces which are formed as reflecting surfaces for reflecting the laser beam, and an fθ lens 20 as an imaging optical system for converging the laser beam reflected and deflected by the polygon mirror 13. For easy understanding of the following description, a direction parallel to a plane perpendicular to the central axis 13a of the polygon mirror 13 and up-down direction in FIG. 1 is defined as a "main scanning direction", and a direction parallel to the central axis 13a and is perpendicular to the main scanning direction is defined as an "auxiliary scanning direction".

The laser beam emitted from the laser light source 11 and collimated by an unshown collimator lens (placed between the laser light source 11 and the cylindrical lens 12) passes through the cylindrical lens 12 and is incident on a reflecting surface of the polygon mirror 13. Since the polygon mirror 13 rotates around its central axis 13a, the laser beam reflected by the reflecting surface is dynamically deflected (scanned) in the main scanning direction. The dynamically deflected laser beam passing through the fθ lens 20 is thereby converged on the target surface S to form a beam spot on the target surface S, which beam spot scans in the main scanning direction at a substantially constant speed.

Incidentally, with regard to the main scanning direction, the laser beam from the laser light source 11 is reflected by a reflecting surface of the polygon mirror 13 maintaining its parallelism and is converged by the fθ lens 20 on the target surface S. Meanwhile, with regard to the auxiliary scanning direction, the laser beam is once converged by the cylindrical lens 12 in the vicinity of a reflecting surface of the polygon mirror 13, enters the fθ lens 20 as a diverging beam, and is converged again by the fθ lens 20 on the scan target surface S. Since each reflecting surface of the polygon mirror 13 and the target surface S are set almost conjugate with each other with respect to the fθ lens 20 with regard to the auxiliary scanning direction as above, the laser beam, reflected by any one of the reflecting surfaces of the polygon mirror 13, is always scanned on the same line on the target surface S regardless of the presence/absence of a facet error of each reflecting surface.

The fθ lens 20 is composed of a scanning lens 21 and a field curvature correction lens 22 for correcting curvature of field which is placed between the scanning lens 21 and the target surface S. The scanning lens 21 is a lens having power for converging the laser beam primarily in the main scanning direction. The field curvature correction lens 22 is a lens having power for converging the laser beam primarily in the auxiliary scanning direction, also having a function for correcting aberrations (e.g., curvature of field and fθ characteristic errors). The optical axes of the lenses 21 and 22 forming the fθ lens 20 coincides with each other at least in the main scanning direction. The optical axis of the scanning lens 21 overlaps, in the main scanning direction, with the axis of a laser beam traveling to a central image height level (image height=0) of the main scanning, and in the auxiliary scanning direction, intersects perpendicularly with the central axis 13a of the polygon mirror 13 at its midpoint (i.e., at the center of the thickness of the polygon mirror 13). The position of the center of each reflecting surface (in a longitudinal direction of each surface) when the laser beam is incident upon the center (that is, the mean position of laser beam reflecting points) can be regarded as the center of the dynamic laser beam deflection by the polygon mirror 13, therefore, the position will be referred to as a "deflection point".

Incidentally, there are cases where a surface of a lens 21 or 22 is not a rotationally symmetrical aspherical surface, and an "optical axis" in its original meaning can not be defined for such a lens surface. Therefore, the term "optical axis" will hereafter be used in the meaning of an axis (optical surface reference axis) passing through an "origin" that is set when the shape of the lens surface is described in a mathematical expression.

Further, a plane that contains the optical axis of the scanning lens 21 and that is parallel to the central axis 13a of the polygon mirror 13 is defined as an "auxiliary scanning cross section", and a plane that contains the optical axis of the scanning lens 21 and that is perpendicular to the central axis 13a is defined as a "main scanning cross section".

The target surface S is, in the embodiments, a photosensitive surface (outer surface) of a rotating photoconductive drum. The rotating photoconductive drum revolves around its rotation axis, which is parallel to the main scanning direction and perpendicular to the optical axis of the fθ lens 20.

Among the components of the scanning optical system 10, those other than the cylindrical lens 12, the polygon mirror 13 and the scanning lens 21 (that is, the laser light source 11, the field curvature correction lens 22 and the target surface S) are provided corresponding to each toner color (yellow, magenta, cyan, black) for color printing. By such composition, simultaneous drawing by the laser beams on four photosensitive surfaces (target surfaces S) of the four rotating drums (for yellow, magenta, cyan and black) becomes possible, and toner images for the four color components (yellow, magenta, cyan, black) are formed on the photosensitive surfaces (target surfaces S) of the rotating drums, respectively. The toner images of four color components are successively transferred to a sheet of printing paper and thereby a color image is printed on the paper.

Figure 2:
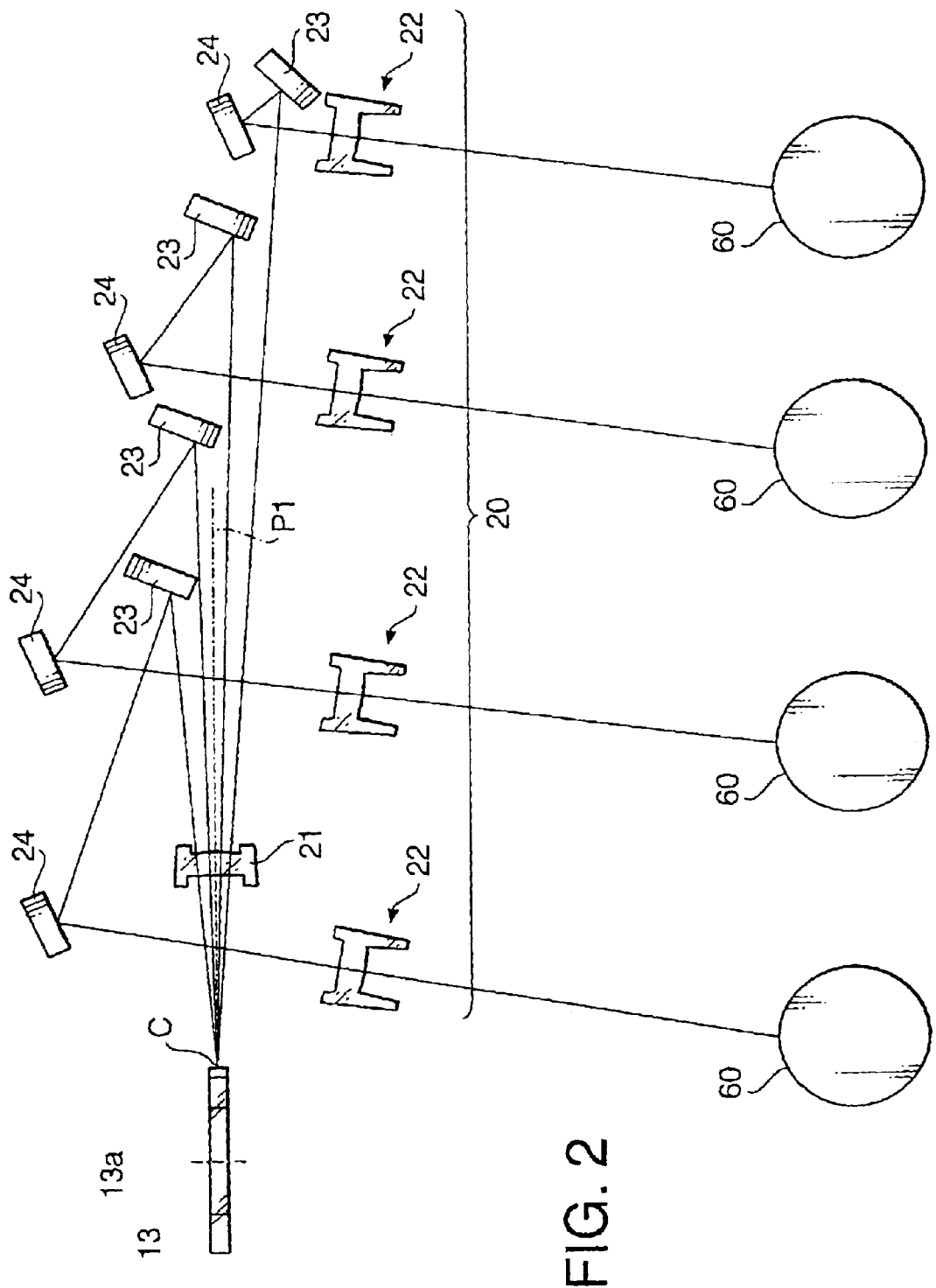
FIG. 2 is an optical block diagram of a scanning optical system built up for color printing (excluding a laser light source and a cylindrical lens) seen along a main scanning direction.

FIG. 2 is a diagram of a scanning optical system built up for the color printing (excluding the laser light source 11 and the cylindrical lens 12) seen in a direction perpendicular to the auxiliary scanning cross section (along the main scanning direction). The laser beams corresponding to the four color components are incident upon the same deflection point on a reflecting surface of the polygon mirror 13 from directions that are slightly tilted in the auxiliary scanning direction such that the four incident beams are symmetrical with respect to the main scanning cross section P1. Consequently, as shown in FIG. 2, the four laser beams reflected by the reflecting surface of the polygon mirror 13 proceed in different directions relative to the main scanning cross section P1, pass through the common scanning lens 21, are respectively reflected by different pairs of mirrors 23 and 24, pass through different field curvature correction lenses 22, and travel into separate photosensitive drums 60 corresponding to the four color components. Therefore, one main scanning for the four photosensitive drums 60 can be conducted simultaneously by one deflection by one reflecting surface of the polygon mirror 13.

The optical paths of the four laser beams after being deflected by the polygon mirror 13 are folded and bent by use of the mirrors 23 and 24 as shown in FIG. 2 in order to minimize the unit size of the scanning optical system 10. In this case, since the wavelengths of the four laser beams passing through the four fθ lenses 20 are the same, the mirrors 23 and 24 for the four colors are placed at proper positions so that optical path lengths from the scanning lens 21 to the image surface curvature correction lenses 22 for the four colors will be the same and the fθ lenses 20 for the four colors will provide the same optical characteristics.

The photosensitive drums 60, formed to have the same cylindrical outer shape of the same size, are placed on the light emitting sides of the field curvature correction lenses 22 at the same distance from the lenses 22.

In an imaging apparatus (e.g., color laser printer and color copier) equipped with a scanning optical system 10 composed as above, each photoconductive drum 60 corresponding to each color component is rotated at a constant angular velocity while each laser beam which has been on-off modulated according to input image information for each color component is repetitively scanned on the outer surface (photosensitive surface: the target surface) of each photoconductive drum 60, by which a two-dimensional electrostatic latent image composed of a plurality of traces (scanning lines) is drawn on each scan target surface S (photosensitive drum 60). Subsequently, a toner image is formed on each photosensitive drum 60 by adding a charged toner electrostatically adhering to the latent image, and the toner images on the drums 60 are transferred to a sheet of printing paper. In color laser printers, color copiers, etc., the printing paper is fed through the photosensitive drums 60 so that corresponding scanning lines on the four drums 60 will form exactly the same line on the printing paper, by which a color image according to the image information is printed on the printing paper.

[Embodiment 1]

In the following, a manufacturing method of the scanning optical system 10 in accordance with a first embodiment of the present invention will be described in detail. In the first embodiment, there will be explained a method for determining whether or not a first surface of the scanning lens 21 forming the fθ lens 20 should be provided with anti-reflection coating.

In the scanning optical system 10 described above, the laser beam is incident on a reflecting surface of the polygon mirror 13 from a direction that is slightly tilted in the auxiliary scanning direction (that is, with a certain incident angle in the auxiliary scanning direction), therefore, ghost light generated by the reflection by the first surface of the scanning lens 21 (hereafter, simply referred to as "ghost light reflected by the first surface of the scanning lens 21") passes above the polygon mirror 13 (on the opposite side of the polygon mirror 13 to the laser light source 11 and the cylindrical lens 12 in the auxiliary scanning direction) or below the polygon mirror 13 (on the same side of the polygon mirror 13 as the laser light source 11 and the cylindrical lens 12 in the auxiliary scanning direction) depending on the power of the sectional form of the scanning lens 21 in the auxiliary scanning cross section (specifically, the shape of the first surface of the scanning lens 21) and the distance D between the scanning lens 21 and the reflecting surface of the polygon mirror 13, by which the ghost light does not reenter the scanning lens 21. In such cases, the anti-reflection coating is not necessary to the lens surface (first surface of the scanning lens 21).

However, when the laser beam's incident angle β on the reflecting surface in the auxiliary scanning direction is large, it becomes difficult to balance the Bow (curvature of scanning lines) and wavefront aberration in the design of the system. On the other hand, if the incident angle β is reduced to avoid the problem, the ghost light reflected by the first surface of the scanning lens 21 might be incident on a reflecting surface of the polygon mirror 13.

Even in such cases, depending on the power of the sectional form of the scanning lens 21 in the main scanning cross section (the shape of the first surface of the scanning lens 21), the ghost light reflected by the first surface of the scanning lens 21 will be incident on a "regular beam reflecting surface" (reflecting surface of the polygon mirror 13 that is reflecting the "regular beam" (laser beam emitted from the laser light source 11 and incident on the reflecting surface via the cylindrical lens 12)) or will be on an "adjacent reflecting surface" (reflecting surface adjacent to the regular beam reflecting surface) with a large incident angle. In the case where the ghost light is incident on the regular beam reflecting surface, the ghost problem does not arise as mentioned before. In the case where the ghost light is incident on the adjacent reflecting surface with a large incident angle, even if the ghost light reflected by the adjacent reflecting surface reenters the fθ lens 20, the ghost light passing through the fθ lens 20 only exposes an area on the target surface S outside a "scanning range" (where the electrostatic latent image to be developed is formed) Therefore, also in these cases, the anti-reflection coating is not necessary to the lens surface (first surface of the scanning lens 21).

If the ghost light is incident on the adjacent reflecting surface with a small incident angle in the main scanning direction, the ghost light reentering the fθ lens 20 can expose the scanning range of the scan target surface S. Therefore, in this case, the anti-reflection coating becomes necessary to the lens surface (first surface of the scanning lens 21).

As explained above, the number of lens surfaces provided with the anti-reflection coating in the fθ lens 20 can be reduced while eliminating the image deterioration caused by the ghost light, by providing the anti-reflection coating to the lens surface under consideration (first surface of the scanning lens 21) only in the case where the ghost light caused by the reflection of the laser beam on the lens surface will be incident on the adjacent reflecting surface of the polygon mirror 13 with a small incident angle in the main scanning direction and will be incident on the scanning range of the target surface S via the fθ lens 20.

Therefore, in the first embodiment, the following first condition (1) regarding the auxiliary scanning direction by which the anti-reflection coating becomes necessary to the first surface (that is, a condition by which the ghost light from the first surface reaches a reflecting surface of the polygon mirror 13 with regard to the auxiliary scanning direction) and the following second condition (2) regarding the main scanning direction by which the anti-reflection coating becomes necessary to the first surface (that is, a condition by which the ghost light from the first surface is reflected by the adjacent reflecting surface of the polygon mirror 13 and reaches the scanning range on the scan target surface S with regard to the main scanning direction) are considered, and the first surface of the scanning lens 21 is designated as the object of the anti-reflection coating only when the two conditions (1) and (2) are satisfied.

$$H/2 > |2\beta D(D-Rz_1)/Rz_1| \quad (1)$$

$$|W| \leq |(4\pi/P) + \alpha + (2a(Ry_1-D)/Ry_1)| \quad (2)$$

where $|a| \leq W/f$.

In the condition (1), "H" denotes the width of each reflecting surface of the polygon mirror 13 in the auxiliary scanning cross section, "β" denotes the incident angle [radian] of the laser beam on the reflecting surface of the polygon mirror 13 in the auxiliary scanning direction, "D" denotes the distance between the reflecting surface of the polygon mirror 13 and the first surface of the scanning lens 21 on its optical axis when the laser beam is incident on the deflection point, and "$Rz_1$" denotes the curvature radius of the first surface of the scanning lens 21 in the auxiliary scanning cross section. In the condition (2), "W" denotes the maximum image height in the scanning range on the scan target surface S (½ of a scan width), "f" denotes the total focal length of the fθ lens 20, "P" denotes the number of reflecting surfaces of the polygon mirror 13, "α" denotes the direction angle [radian] of the laser beam incident on the polygon mirror 13 measured in the main scanning direction ("deflection angle" relative to the optical axis of the fθ lens 20, having a polarity "−" in the clockwise direction), "a" denotes the swing angle [radian] of the laser beam reflected by the polygon mirror 13 measured in the main scanning direction ("scan angle" relative to the optical axis of the fθ lens 20, having a polarity "+" in the counterclockwise direction and a polarity "−" in the clockwise direction), and "$Ry_1$" denotes the curvature radius of the first surface of the scanning lens 21 in the main scanning cross section.

In the following, an example (example 1) of the scanning optical system 10 according to the first embodiment of the present invention, satisfying the above conditions (1) and (2), will be described.

EXAMPLE 1

Figure 3:
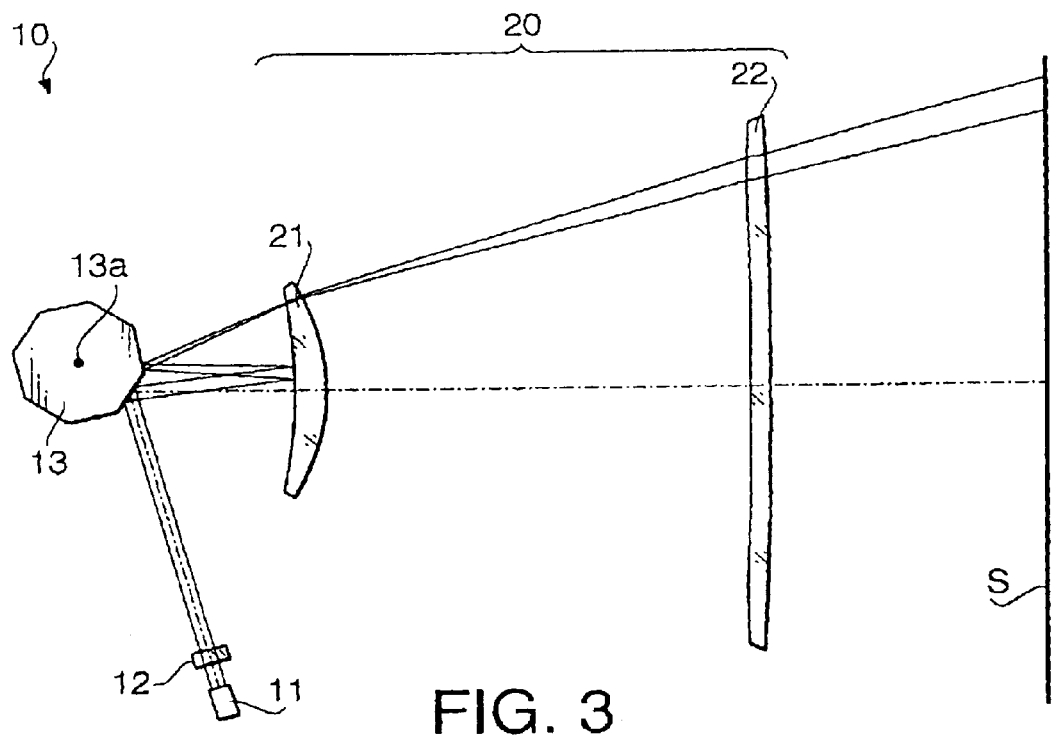
FIG. 3 shows a scanning optical system of an example 1 viewed along a auxiliary scanning direction.
Figure 4:
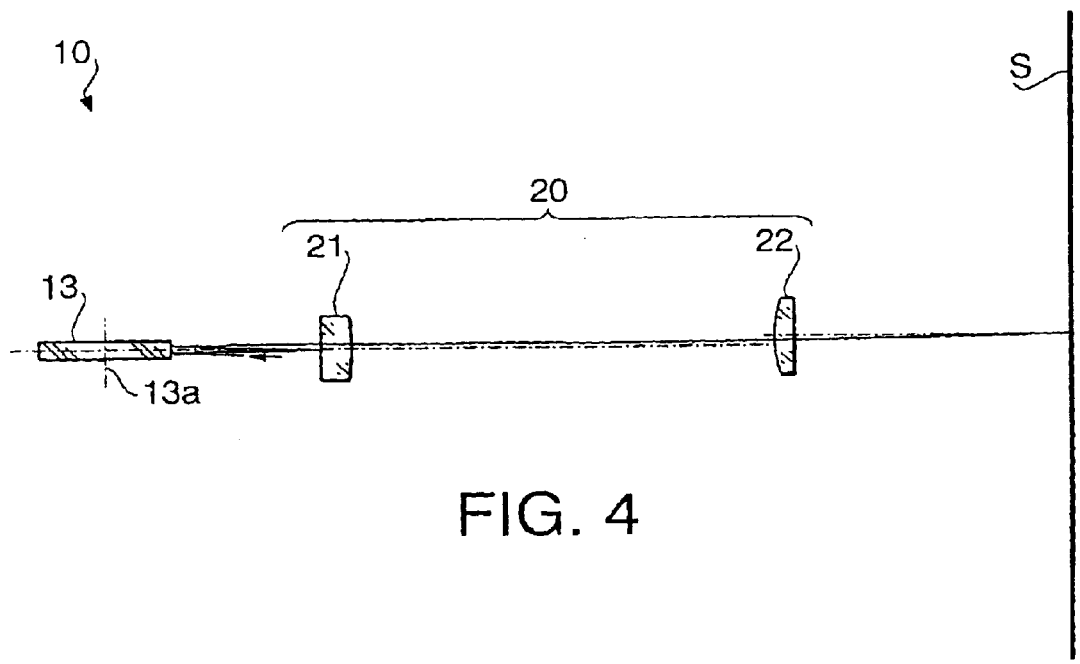
FIG. 4 shows the scanning optical system of the example 1 viewed along a main scanning direction.

FIG. 3 is a developed view of the scanning optical system 10 of an example 1 viewed along the auxiliary scanning direction and FIG. 4 is a developed view of the scanning optical system 10 viewed along the main scanning direction. Note that, in FIGS. 3 and 4, the regular beam that passes through the scanning lens 21 is not shown, and the laser light source 11 and the cylindrical lens 12 are omitted in FIG. 4 for brevity.

In the example 1, the total focal length f of the fθ lens 20 is 235 mm, the scan width on the target surface S is 216 mm, the design wavelength is 780 mm, the polygon width H (the width of the deflection surface of the polygon mirror 13 in the auxiliary scanning direction) is 3.0 mm, the deflection angle α is −75.0° (=−1.3090 rad), and the incident angle β of the laser beam on the reflecting surface of the polygon mirror 13 in the auxiliary scanning direction is 0.95° (=0.0166 rad).

TABLE 1 shows numerical data of surfaces existing on the optical path from the cylindrical lens 12 to the target surface S in the example 1. The numerical data shown in TABLE 1 refers to data in a paraxial condition with respect to the optical axis of the scanning lens 21 at the point when the laser beam which passed through the cylindrical lens 12 is reflected by a reflecting surface of the polygon mirror 13 at the deflection point. Since the optical axis of the field curvature correction lens 22 is shifted from the optical axis of the scanning lens 21 in the auxiliary scanning direction, the numerical data of the surfaces of the field curvature correction lens 22 refers to data of a paraxial condition with respect to the optical axis of the field curvature correction lens 22.

TABLE 1

| No | Ry | Rz | d | N (780 nm) | DECZ | Name |
|---|---|---|---|---|---|---|
| 1 | ∞ | +51.08 | 4.00 | 1.51072 | 0.00 | Cylindrical lens |
| 2 | ∞ |  | 97.00 |  |  |  |

TABLE 1-continued

| No | Ry | Rz | d | N (780 nm) | DECZ | Name |
|---|---|---|---|---|---|---|
| 3 | ∞ |  | 54.00 |  | 0.00 | Polygon mirror |
| 4 | −184.70 |  | 10.00 | 1.48617 | 0.00 | 1st Surface of Scanning Lens |
| 5 | −70.53 | −100.00 | 140.00 |  |  | 2nd Surface of Scanning Lens |
| 6 | −817.63 |  | 6.00 | 1.48617 | 3.00 | 1st Surface of Field Curvature Correction Lens |
| 7 | −1800.00 |  | 91.20 |  |  | 2nd Surface of Field Curvature Correction Lens |
| 8 | ∞ |  |  |  | 0.00 | Image Plane |

In TABLE 1, the column "No" indicates surface numbers, in which No.1 and No.2 denote front and rear surfaces of the cylindrical lens 12, No.3 denotes a reflecting surface of the polygon mirror 13, No.4 and No.5 denote first and second surfaces of the scanning lens 21, No.6 and No.7 denote first and second surfaces of the field curvature correction lens 22, and No.8 denotes the scan target surface S. The symbol "Ry" denotes the radius of curvature [mm] in the main scanning direction, which takes on negative values when the center of curvature exists on the light source side of an intersection point of the lens surface and the optical axis and takes on positive values when the center of curvature exists behind the intersection point. The symbol "Rz" denotes the radius [mm] of curvature in the auxiliary scanning direction, which also takes on negative values when the center of curvature exists on the light source side of the intersection point of the lens surface and the optical axis and positive values when the center of curvature exists behind the intersection point. In cases where Rz=Ry (rotationally symmetrical surface), Rz is omitted in Table 1. The symbol "d" denotes the distance [mm] between the surface and the next surface measured on the optical axis (beam axis) and "N" denotes the refractive index of a medium between the surface and the next surface with regard to the design wavelength (the index for air being omitted). The symbol "DECZ" denotes a shift amount [mm] of the optical axis of the surface relative to the optical axis of the anterior surface measured in the auxiliary scanning direction, which takes on positive values when the optical axis shifts upward in FIG. 4.

As seen in TABLE 1, the cylindrical lens 12 has a cylindrical front surface and a planar rear surface. The first surface of the scanning lens 21 and the second surface of the field curvature correction lens 22 are rotationally symmetrical.

The second surface of the scanning lens 21 is an anamorphic aspherical surface (aspherical surface whose curvatures in the main scanning cross section and auxiliary scanning cross section are independently defined such that the curvature in the main scanning cross section is defined by a function of a distance from the optical axis in the main scanning direction and the radius in the auxiliary scanning direction is defined by another function of a distance from the optical axis in the main scanning direction). Therefore, the shape of the surface in the main scanning cross section is expressed by the following equation (5) as a SAG amount X(y) of a point (having a height y (i.e., the distance in the main scanning direction) from the optical axis) from a tangential plane contacting the surface on the optical axis, and the shape of the surface in the auxiliary scanning direction at each height y can be expressed by the following equation (6) as an arc curvature 1/[Rz(y)].

$$X(y) = 1/Ry \cdot y^2 / \left[1 + [1-(\kappa+1)y^2/Ry^2]^{1/2}\right] + AM_1 y + AM_2 y^2 + \qquad (5)$$
$$AM_3 y^3 + AM_4 y^4 + AM_5 y^5 + AM_6 y^6 + AM_7 y^7 AM_8 y^8$$

$$1/[Rz(y)] = 1/Rz + AS_1 y + AS_2 y^2 + \qquad (6)$$
$$AS_3 y^3 + AS_4 y^4 + AS_5 y^5 + AS_6 y^6 + AS_7 y^7 + AS_8 y^8$$

In the equations (5) and (6), "Ry" and "Rz" denote the paraxial radii of curvatures in the main and auxiliary scanning directions which have been shown in TABLE 1, "κ" denotes a conical constant, "$AM_1$", "$AM_2$", "$AM_3$", "$AM_4$", "$AM_5$", "$AM_6$", "$AM_7$", "$AM_8$", . . . denote aspherical coefficients of each order with regard to the main scanning direction, and "$AS_1$", "$AS_2$", "$AS_3$", "$AS_4$", "$AS_5$", "$AS_6$", "$AS_7$", "$AS_8$", . . . denote aspherical coefficients of each order with regard to the auxiliary scanning direction. The coefficients of the equations (5) and (6) specifying the particular shape of the second surface of the scanning lens 21 of the example 1 will be shown in the following TABLE 2.

TABLE 2

| K | 0.00E+00 | | |
|---|---|---|---|
| $AM_1$ | 0.00E+00 | $AS_1$ | 8.16E−06 |
| $AM_2$ | 0.00E+00 | $AS_2$ | 5.73E−07 |
| $AM_3$ | 0.00E+00 | $AS_3$ | −1.80E−08 |
| $AM_4$ | 1.24E−07 | $AS_4$ | −7.26E−09 |
| $AM_5$ | 0.00E+00 | $AS_5$ | 5.25E−11 |
| $AM_6$ | −9.74E−12 | $AS_6$ | 1.02E−11 |
| $AM_7$ | 0.00E+00 | $AS_7$ | −3.63E−14 |
| $AM_8$ | 6.78E−15 | $AS_8$ | −5.24E−15 |

The first surface of the image surface curvature correction lens 22 is a quadratic polynomial aspherical surface (aspherical surface expressed by polynomial expressions regarding heights in the main and auxiliary scanning directions), therefore, the shape of the surface can be expressed by the following equation (7) as a SAG amount X(y,z) of a point (having heights y and z in the main and auxiliary scanning directions from the optical axis) from a tangential plane contacting the surface on the optical axis.

$$X(y,z) = \qquad (7)$$
$$1/Ry \cdot (y^2+z^2) / \left[1 + [1-(\kappa+1) \cdot (y^2+z^2)/Ry^2]^{1/2}\right] + \sum Bmn y^m z^n$$

In the equation (7), "Ry" denotes the paraxial radius of curvature in the main scanning direction which has been shown in TABLE 1, "κ" denotes a conical constant, and "Bmn" denotes an aspherical coefficient of m-th and n-th orders in the main and auxiliary scanning directions, respectively. The coefficients of the equation (7) specifying the particular shape of the first surface of the field curvature correction lens 22 of the example 1 will be shown in the following Table 3.

Coefficients extracted from the above numerical data of the example 1 to be substituted into the condition (1) are as follows:

H = 3.0 mm
β = 0.0166 rad
D = −54.0 mm
$Rz_1$ = −184.70 mm

Substituting the coefficients into the condition (1) gives 1.5>1.27 (correct), that is, the condition (1) is satisfied in the example 1.

Since the condition (1) regarding the first surface of the scanning lens 21 is satisfied in the example 1, the ghost light caused by the reflection on the first surface of the scanning lens 21 reaches a reflecting surface of the polygon mirror 13 with regard to the auxiliary scanning direction, as shown in FIG. 4.

Meanwhile, coefficients extracted from the above numerical data of the example 1 to be substituted into the condition (2) are as follows:

W = 108 mm
f = 235 mm
P = 8
D = −54.0 mm
α = −1.3090 rad
$Ry_1$ = −184.70 mm

The range of the scan angle "a" for scanning the laser beam within the aforementioned scan width 216 mm is:

−0.46 rad (−26.3°)≤a≤0.14 rad (7.9°)

By substituting the coefficients into the condition (2), the left-hand side gives 108 mm and the right-hand side gives 91.5–108.1 mm (depending on the scan angle "a" in the above range), thus the condition (2) is partially satisfied in the above range of the scan angle "a".

Therefore, in the example 1, without the anti-reflection coating on the first surface of the scanning lens 21, the ghost light caused by the reflection on the first surface enters the adjacent reflecting surface of the polygon mirror 13 and is incident on the scanning range on the target surface S during one scan of the regular beam.

Thus, in the example 1, the first surface of the scanning lens 21 is designated as the object of the anti-reflection coating, and the surface is provided with the anti-reflection coating.

COMPARATIVE EXAMPLE 1

Figure 5:
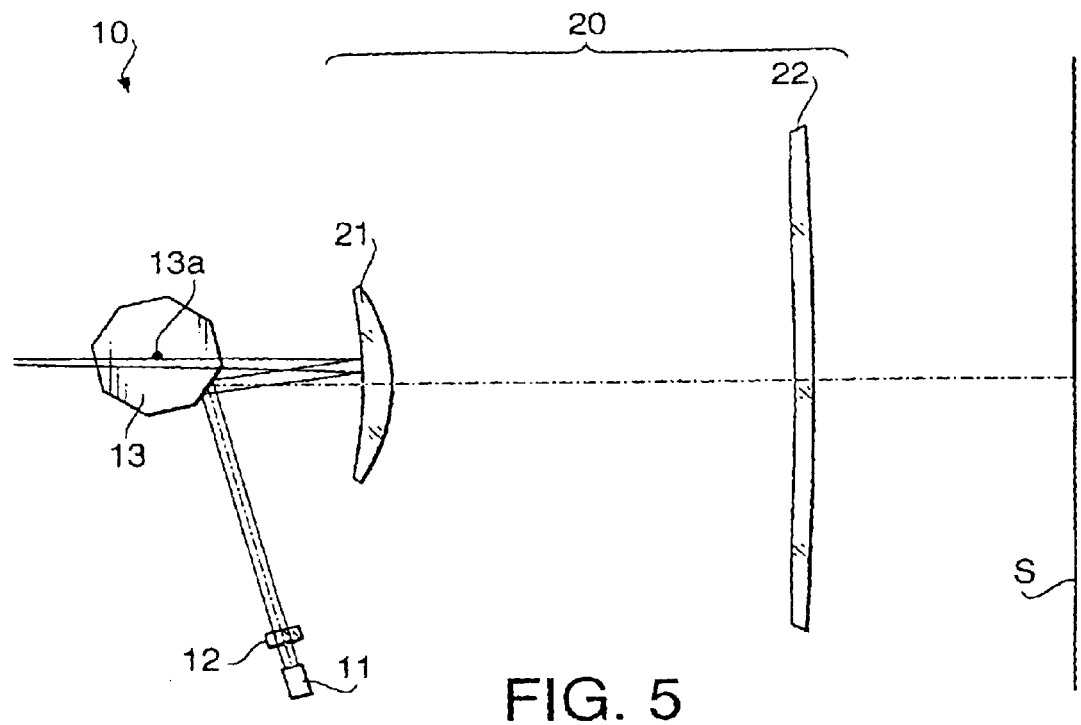
FIG. 5 shows a scanning optical system of a comparative example 1 viewed along the auxiliary scanning direction.

Next, an example that does not satisfy the condition (1) will be shown as a comparative example 1 in contrast to the example 1. FIG. 5 shows a scanning optical system 10 as the

TABLE 3

Figure 6:
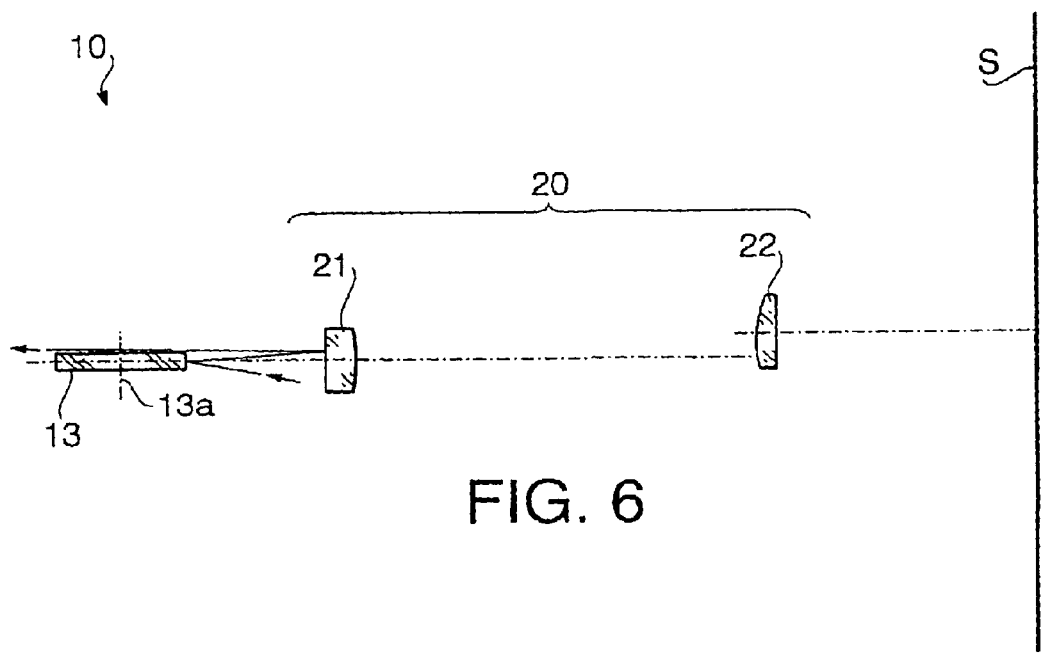
FIG. 6 shows the scanning optical system of the comparative example 1 viewed along the main scanning direction.

| | $B_{Z0}$ | $B_{Z1}$ | $B_{Z2}$ | $B_{Z3}$ | $B_{Z4}$ |
|---|---|---|---|---|---|
| $B_{Y0}$ | | 2.899E−02 | 1.598E−02 | 1.519E−05 | −1.041E−06 |
| $B_{Y2}$ | 2.367E−05 | −2.543E−07 | −2.568E−07 | −1.037E−10 | −1.323E−10 |
| $B_{Y4}$ | 6.795E−08 | −7.351E−11 | −3.067E−12 | −3.704E−13 | −2.604E−14 |
| $B_{Y6}$ | −2.184E−12 | 1.035E−14 | 8.116E−16 | −1.143E−17 | 0.000E+00 |
| $B_{Y8}$ | 4.790E−17 | −5.730E−19 | 0.000E+00 | 0.000E+00 | 0.000E+00 | comparative example 1 viewed along the auxiliary scanning direction, and FIG. 6 shows the scanning optical system 10 viewed along the main scanning direction. In FIGS. 5 and 6, the regular beam passing through the scanning lens 21 are not shown. The laser light source 11 and the cylindrical lens 12 are omitted in FIG. 6 for brevity.

In the comparative example 1, the total focal length f of the fθ lens 20 is 235 mm, the scan width on the target surface S is 216 mm, the design wavelength is 780 nm, the polygon width H is 3.0 mm, the deflection angle α is −75.0° (=−1.3090 rad), and the incident angle β of the laser beam on the reflecting surface of the polygon mirror 13 in the auxiliary scanning direction is 2.83° (=0.0494 rad).

Table 4 shows numerical data of surfaces existing on the optical path from the cylindrical lens 12 to the scan target surface S in the comparative example 1. The meanings of the characters shown in Table 4 are the same as those in Table 1.

TABLE 4

| No | Ry | Rz | d | N (780 nm) | DECZ | Name |
|---|---|---|---|---|---|---|
| 1 | ∞ | +51.08 | 4.00 | 1.51072 | 0.00 | Cylindrical lens |
| 2 | ∞ | | 97.00 | | | |
| 3 | ∞ | | 54.00 | | 0.00 | Polygon mirror |
| 4 | −184.70 | | 10.00 | 1.48617 | 0.00 | 1st Surface of Scanning Lens |
| 5 | −70.53 | −100.00 | 140.00 | | | 2nd Surface of Scanning Lens |
| 6 | −850.00 | | 6.00 | 1.48617 | 9.00 | 1st Surface of Field Curvature Correction Lens |
| 7 | −1800.00 | | 91.00 | | | 2nd Surface of Field Curvature Correction Lens |
| 8 | ∞ | | | | 0.00 | Image Plane |

As seen in TABLE 4, the cylindrical lens 12 has a cylindrical front surface and a planar rear surface. The first surface of the scanning lens 21 and the second surface of the image surface curvature correction lens 22 are rotationally symmetrical.

The second surface of the scanning lens 21 is an anamorphic aspherical surface. The coefficients of the equations (5) and (6) specifying the particular shape of the second surface of the scanning lens 21 of the comparative example 1 will be shown in the following TABLE 5.

TABLE 5

| K | | 0.00E+00 | |
|---|---|---|---|
| $AM_1$ | 0.00E+00 | $AS_1$ | 8.16E−06 |
| $AM_2$ | 0.00E+00 | $AS_2$ | 5.73E−07 |
| $AM_3$ | 0.00E+00 | $AS_3$ | −1.80E−08 |

TABLE 5-continued

| K | | 0.00E+00 | |
|---|---|---|---|
| $AM_4$ | 1.24E−07 | $AS_4$ | −7.26E−09 |
| $AM_5$ | 0.00E+00 | $AS_5$ | 5.25E−11 |
| $AM_6$ | −9.74E−12 | $AS_6$ | 1.02E−11 |
| $AM_7$ | 0.00E+00 | $AS_7$ | −3.63E−14 |
| $AM_8$ | 6.78E−15 | $AS_8$ | −5.24E−15 |

The first surface of the field curvature correction lens 22 is a two dimensional polynomial aspherical surface. The coefficients of the equation (7) specifying the particular shape of the first surface of the image surface curvature correction lens 22 of the comparative example 1 will be shown in the following TABLE 6.

TABLE 6

| | $B_{Z0}$ | $B_{Z1}$ | $B_{Z2}$ | $B_{Z3}$ | $B_{Z4}$ |
|---|---|---|---|---|---|
| $B_{Y0}$ | | 8.662E−02 | 1.589E−02 | −3.156E−06 | −1.767E−06 |
| $B_{Y2}$ | 4.490E−06 | −7.494E−07 | −2.523E−07 | −3.649E−10 | −1.966E−10 |
| $B_{Y4}$ | 5.456E−08 | −2.099E−10 | −3.131E−12 | 1.723E−14 | −3.394E−14 |
| $B_{Y6}$ | 6.314E−13 | 2.856E−14 | 8.730E−16 | −1.216E−16 | 0.000E+00 |
| $B_{Y8}$ | −1.455E−16 | −1.547E−18 | 0.000E+00 | 0.000E+00 | 0.000E+00 |

Coefficients extracted from the above numerical data of the comparative example 1 to be substituted into the condition (1) are as follows:

H = 3.0 mm
β = 0.0494 rad
D = −54.0 mm
$Rz_1$ = −184.70 mm

Substituting the coefficients into the condition (1) gives 1.5>3.78 (incorrect), that is, the condition (1) is not satisfied in the comparative example 1.

Since the condition (1) regarding the first surface of the scanning lens 21 is not satisfied in the comparative example 1, the ghost light from the first surface of the scanning lens 21 passes above the polygon mirror 13 and reaches none of its reflecting surfaces as shown in FIGS. 5 and 6. The ghost light does not reenter the scanning lens 21 and no ghost is caused on the scan target surface S. Therefore, the first surface of the scanning lens 21 is not designated as the object of the anti-reflection coating and thereby costs for the anti-reflection coating can be saved.

[Embodiment 2]

In the following, a manufacturing method of the scanning optical system 10 in accordance with a second embodiment of the present invention will be described in detail. In the second embodiment, there will be explained a method for determining whether or not the second surface of the scanning lens 21 forming the fθ lens 20 should be provided with the anti-reflection coating. The reflection on the second surface is internal reflection in the scanning lens 21, thus a beam constituting the ghost light is refracted by the first surface twice and travels through the medium of the scanning lens 21 twice during its back-and-forth propagation. Therefore, a condition regarding the auxiliary scanning direction by which it is determined whether the anti-reflection coating becomes necessary to the second surface (that is, a condition by which it is determined whether the ghost light from the second surface reaches a reflecting surface of the polygon mirror 13 with regard to the auxiliary scanning direction) and a condition regarding the main scanning direction by which it is determined whether the anti-reflection coating becomes necessary to the second surface (that is, a condition by which it is determined whether the ghost light from the second surface is reflected by the adjacent reflecting surface of the polygon mirror 13 and reaches the scanning range on the scan target surface S with regard to the main scanning direction) can be obtained by modifying the aforementioned conditions (1) and (2) of the first embodiment in consideration of the effects of the first surface and the medium of the scanning lens 21, by which the following conditions (3) and (4) are obtained. Only when both of the conditions (3) and (4) are satisfied, the second surface of the scanning lens 21 is designated as the object of the anti-reflection coating.

$$H/2 > |\beta D(D-Lz)/Lz| \quad (3)$$

where $Lz = Rz_1 Rz_2 D / (2NRz_1 D - 2(N-1)Rz_2 D - Rz_1 Rz_2)$ $$|W| \leq f[(4\pi/P) - \alpha + (a(Ly-D)/Ly)] \quad (4)$$

where, $|a| \leq W/f$, $Ly = Ry_1 Ry_2 D / (2NRy_1 D - 2(N-1)Ry_2 D - Ry_1 Ry_2)$. In the conditions (3) and (4), the same symbols as those of the conditions (1) and (2) have the same meanings as those of the conditions (1) and (2). The character "$Rz_2$" denotes the radius of curvature of the second surface of the scanning lens 21 in the auxiliary scanning cross section, "$Ry_2$" denotes the radius of curvature of the second surface in the main scanning cross section, and "N" denotes the refractive index of the medium of the scanning lens 21 with respect to the working wavelength (wavelength of the laser beam).

In the following, an example (example 2) of the scanning optical system 10 according to the second embodiment of the present invention, satisfying the above conditions (3) and (4), will be described.

EXAMPLE 2

Figure 7:
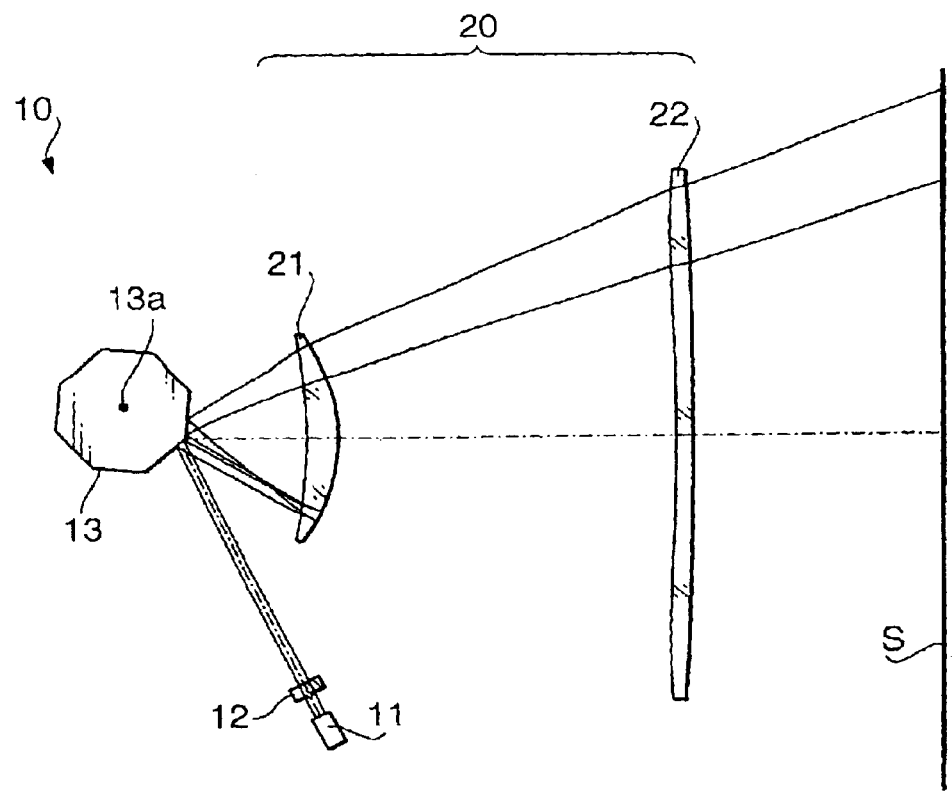
FIG. 7 shows a scanning optical system of an example 2 viewed along the auxiliary scanning direction.
Figure 8:
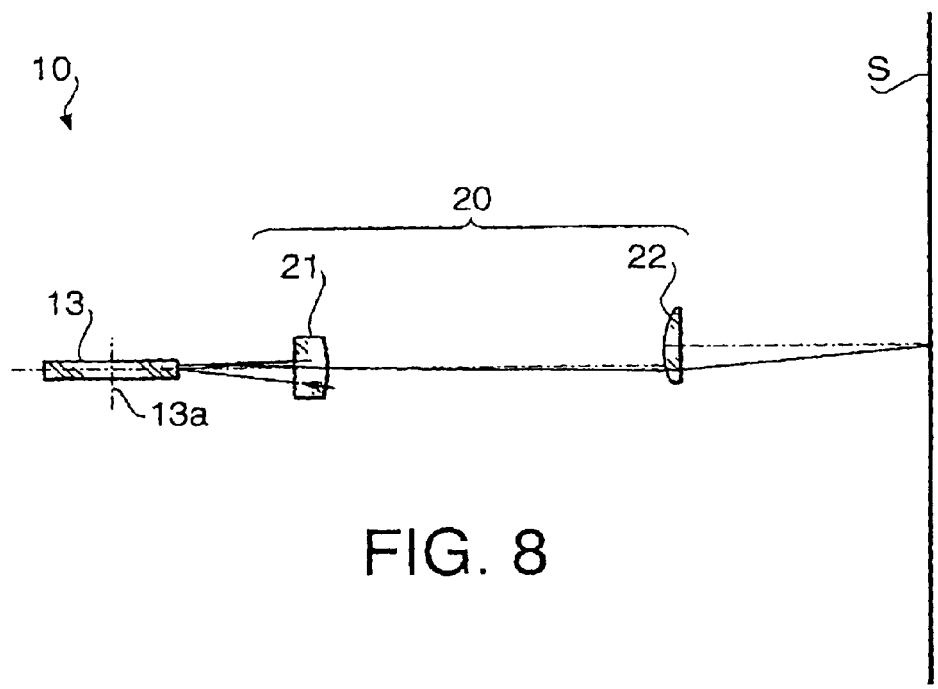
FIG. 8 shows the scanning optical system of the example 2 viewed along the main scanning direction.

FIG. 7 shows the scanning optical system 10 of the example 2 viewed along the auxiliary scanning direction and FIG. 8 shows a the scanning optical system 10 viewed along the main scanning direction. In FIGS. 7 and 8, the regular beam passing through the scanning lens 21 are not shown, and the laser light source 11 and the cylindrical lens 12 are omitted in FIG. 8 for brevity.

In the example 2, the total focal length f of the fθ lens 20 is 200 mm, the scan width on the scan target surface S is 216 mm, the design wavelength is 780 nm, the polygon width H is 4.0 mm, the deflection angle α is −65.0° (=−1.1345 rad) and the incident angle β of the laser beam on the reflecting surface of the polygon mirror 13 in the auxiliary scanning direction is 2.83° (=0.0494 rad).

TABLE 7 shows numerical data of surfaces existing on the optical path from the cylindrical lens 12 to the target surface S in the example 2. The meanings of the symbols shown in TABLE 7 are the same as those in Table 1.

TABLE 7

| No | Ry | Rz | d | N (780 nm) | DECZ | Name |
|---|---|---|---|---|---|---|
| 1 | ∞ | +51.08 | 4.00 | 1.51072 | 0.00 | Cylindrical lens |
| 2 | ∞ | | 97.00 | | | |
| 3 | ∞ | | 42.00 | | 0.00 | Polygon mirror |
| 4 | −185.60 | | 10.00 | 1.48617 | 0.00 | 1st Surface of Scanning Lens |
| 5 | −63.00 | −100.00 | 112.50 | | | 2nd Surface of Scanning Lens |
| 6 | −600.00 | | 5.00 | 1.48617 | 7.00 | 1st Surface of Field Curvature Correction Lens |
| 7 | −1800.00 | | 82.53 | | | 2nd Surface of Field Curvature Correction Lens |
| 8 | ∞ | | | | 0.00 | Image Plane |

As seen in TABLE 7, the cylindrical lens 12 has a cylindrical front surface and a plane rear surface. The first surface of the scanning lens 21 and the second surface of the field curvature correction lens 22 are rotationally symmetrical.

The second surface of the scanning lens 21 is an anamorphic aspherical surface. The coefficients of the equations (5) and (6) specifying the particular shape of the second surface of the scanning lens 21 of the example 2 will be shown in the following TABLE 8.

TABLE 8

| K | | 0.00E+00 | |
|---|---|---|---|
| $AM_1$ | 0.00E+00 | $AS_1$ | 1.11E−05 |
| $AM_2$ | 0.00E+00 | $AS_2$ | 2.23E−06 |
| $AM_3$ | 0.00E+00 | $AS_3$ | 1.89E−08 |
| $AM_4$ | 2.19E−07 | $AS_4$ | −8.32E−09 |
| $AM_5$ | 0.00E+00 | $AS_5$ | −1.51E−11 |
| $AM_6$ | −1.92E−12 | $AS_6$ | 2.49E−12 |
| $AM_7$ | 0.00E+00 | $AS_7$ | 0.00E+00 |
| $AM_8$ | 1.38E−15 | $AS_8$ | 0.00E+00 |
| $AM_9$ | 0.00E+00 | $AS_9$ | 0.00E+00 |
| $AM_{10}$ | −3.29E−18 | $AS_{10}$ | 0.00E+00 |

The first surface of the field curvature correction lens 22 is a two dimensional polynomial aspherical surface. The coefficients of the equation (7) specifying the particular shape of the first surface of the image surface curvature correction lens 22 of the example 2 will be shown in the following TABLE 9.

TABLE 9

| | $B_{Z0}$ | $B_{Z1}$ | $B_{Z2}$ | $B_{Z3}$ | $B_{Z4}$ |
|---|---|---|---|---|---|
| $B_{Y0}$ | | 8.484E−02 | 1.853E−02 | 1.100E−05 | −1.370E−06 |
| $B_{Y2}$ | 1.018E−05 | −9.633E−07 | −4.347E−07 | −3.826E−09 | −1.378E−10 |
| $B_{Y4}$ | 1.095E−07 | −3.323E−10 | −2.867E−12 | −5.060E−14 | −2.603E−14 |
| $B_{Y6}$ | −3.913E−12 | 3.286E−14 | 1.368E−15 | −8.914E−17 | 0.000E+00 |
| $B_{Y8}$ | 3.966E−16 | −9.911E−19 | 0.000E+00 | 0.000E+00 | 0.000E+00 |

Coefficients extracted from the above numerical data of the example 2 to be substituted into the condition (3) are as follows:

$$
\begin{aligned}
H &= 4.0 \text{ mm} \\
\beta &= 0.0494 \text{ rad} \\
D &= -42.0 \text{ mm} \\
N &= 1.48617 \\
Rz_1 &= -185.60 \text{ mm} \\
Rz_2 &= -100.00 \text{ mm}
\end{aligned}
$$

Substituting the coefficients into the condition (3) gives 2.0>2.02 (incorrect), that is, the condition (3) is not satisfied in the example 2.

Incidentally, the radii Rz of curvatures of the first and second surfaces of the scanning lens 21 in the auxiliary scanning direction which are shown in TABLE 7 are paraxial radii of curvatures, that is, the radii of curvatures for a laser beam that forms a spot on the target surface S at a position corresponding to an image height Y=0 mm; however, the condition (3) may be satisfied at any position within the scan width. For example, the radius $Rz_2$ of curvature of the second surface of the scanning lens 21 in the auxiliary scanning direction for a laser beam that forms a spot on the target surface S at a position corresponding to an image height Y=61.5 mm is calculated as:

$Rz_2 = -90.69$ mm.

In another example, when the image height Y=110 mm, the radius Rz2 is calculated as:

$Rz_2 = -79.86$ mm

The first surface of the scanning lens 21 has a constant radius of curvature since it is a spherical surface. Substituting the coefficients (in the case of the laser beam forming the spot at the position of the image heights Y=61.5 mm and Y=110 mm, respectively) into the condition (3) gives 2.0>1.75 (correct) and 2.0>1.36 (correct), respectively. That is, the condition (3) is satisfied also in this case of the image heights Y=61.5 mm and Y=110 mm, respectively.

Since the condition (3) regarding the first and second surfaces of the scanning lens 21 is satisfied in the example 2 at least at two points substantially within the scanning range (Y=61.5 mm and Y=110 mm), the ghost light caused by the reflection on the second surface of the scanning lens 21 reaches a reflecting surface of the polygon mirror 13 with regard to the auxiliary scanning direction, as shown in FIG. 8. It should be noted that Y=110 mm is slightly outside the scanning range, and thus, it is ensured that the condition (3) is satisfied within the scanning range.

Meanwhile, coefficients extracted from the above numerical data of the example 2 to be substituted into the condition (4) are as follows:

$$
\begin{aligned}
W &= 108 \text{ mm} \\
f &= 200 \text{ mm} \\
P &= 8 \\
D &= -42.0 \text{ mm} \\
N &= 1.48617 \\
\alpha &= -1.1345 \text{ rad} \\
Ry_1 &= -185.60 \text{ mm} \\
Ry_2 &= -63.00 \text{ mm}
\end{aligned}
$$

The range of the scan angle "a" for scanning the laser beam within the aforementioned scan width 216 mm is:

$-0.54$ rad ($-30.9°$) $\leq a \leq 0.43$ rad ($24.8°$)

By substituting the coefficients into the condition (4), the left-hand side gives 108 mm and the right-hand side gives 61.5–107.8 mm (depending on the scan angle "a" in the above range) thus the condition (4) is partially satisfied in the above range of the scan angle "a".

Therefore, in the example 2, without the anti-reflection coating on the second surface of the scanning lens 21, the ghost light caused by the reflection on the second surface enters the adjacent reflecting surface of the polygon mirror 13 and is incident on the scanning range on the target surface S during one scan of the regular beam.

Thus, in the example 2, the second surface of the scanning lens 21 is designated as the object of the anti-reflection coating, and the surface is provided with the anti-reflection coating.

[COMPARATIVE EXAMPLE 2]

Figure 9:
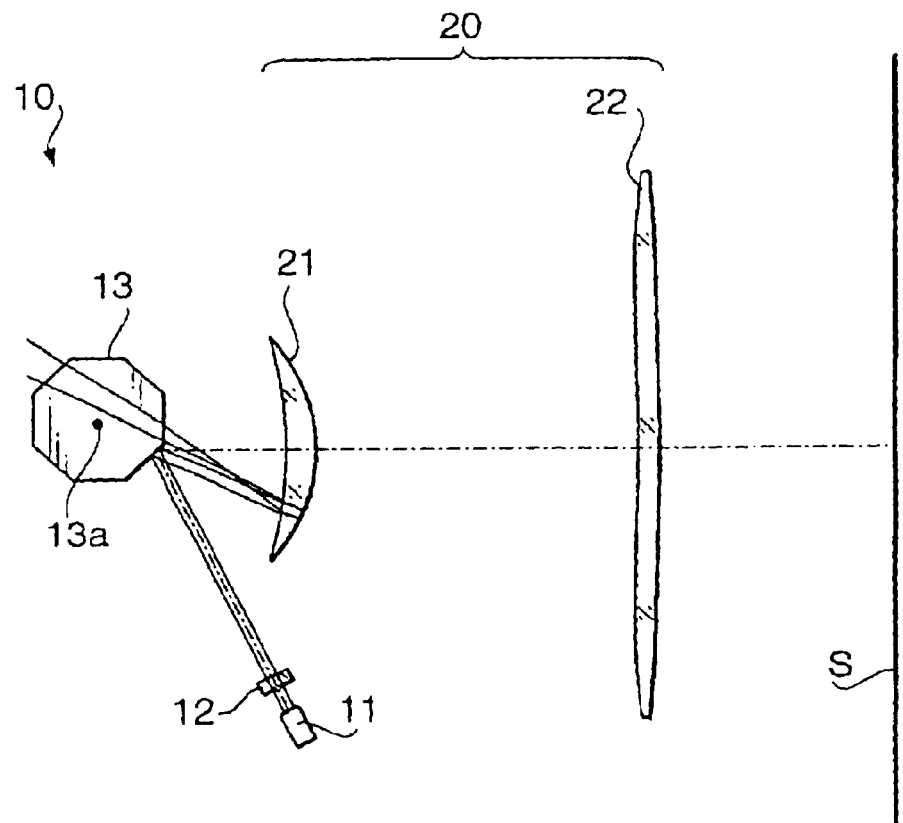
FIG. 9 shows a scanning optical system of a comparative example 2 viewed along the auxiliary scanning direction.
Figure 10:
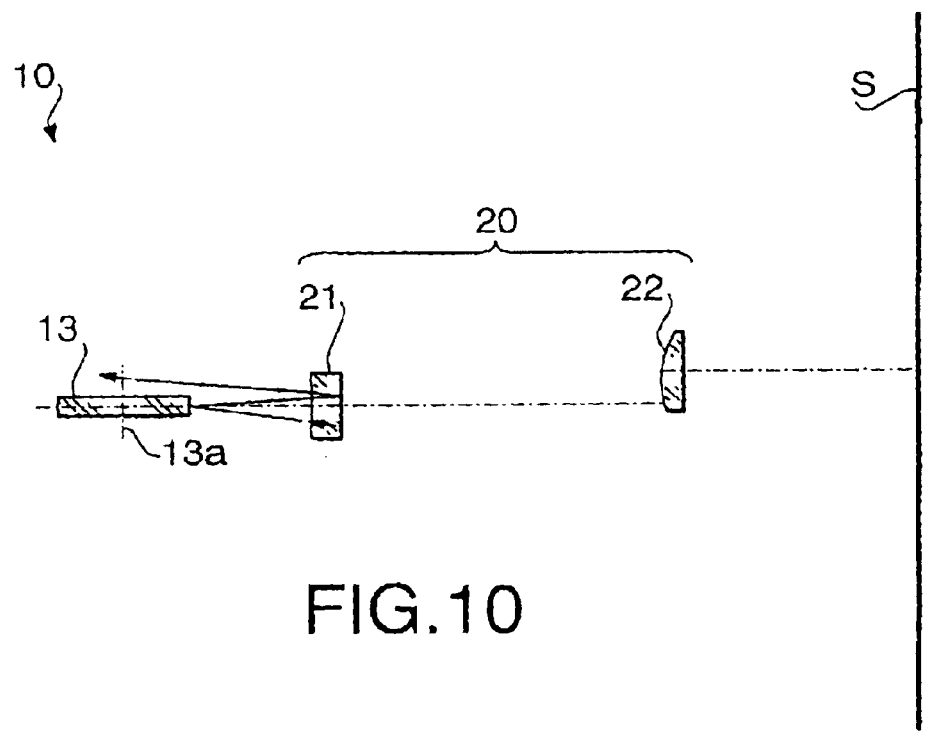
FIG. 10 shows the scanning optical system of the comparative example 2 viewed along the main scanning direction.

Next, an example that does not satisfy the condition (3) will be shown as a comparative example 2 in contrast to the example 2. FIG. 9 shows a scanning optical system 10 as the comparative example 2 viewed along the auxiliary scanning direction and FIG. 10 is shows the scanning optical system 10 viewed along the main scanning direction. In FIGS. 9 and 10, the regular beam passing through the scanning lens 21 are not shown, and the laser light source 11 and the cylindrical lens 12 are omitted in FIG. 10 for brevity.

In the comparative example 2, the total focal length f of the fθ lens 20 is 200 mm, the scan width on the scan target surface S is 216 mm, the design wavelength is 780 nm, the polygon width H is 4.0 mm, the deflection angle α is $-65.0°$ ($=-1.1345$ rad), and the incident angle β of the laser beam on the reflecting surface of the polygon mirror 13 in the auxiliary scanning direction is $3.54°$ ($=0.0617$ rad).

TABLE 10 shows numerical data of surfaces existing on the optical path from the cylindrical lens 12 to the target surface S in the comparative example 2. The meanings of the symbols shown in TABLE 10 are the same as those in TABLE 1.

TABLE 10

| No | Ry | Rz | d | N (780 nm) | DECZ | Name |
|---|---|---|---|---|---|---|
| 1 | ∞ | +51.08 | 4.00 | 1.51072 | 0.00 | Cylindrical lens |
| 2 | ∞ | | 97.00 | | | |
| 3 | ∞ | | 45.42 | | 0.00 | Polygon mirror |
| 4 | −185.60 | | 10.00 | 1.48617 | 0.00 | 1st Surface of Scanning Lens |
| 5 | −63.79 | −300.00 | 113.11 | | | 2nd Surface of Scanning Lens |
| 6 | −958.42 | | 7.00 | 1.48617 | 11.00 | 1st Surface of Field Curvature Correction Lens |
| 7 | −1800.00 | | 82.61 | | | 2nd Surface of Field Curvature Correction Lens |
| 8 | ∞ | | | | 0.00 | Image Plane |

As seen in TABLE 10, the cylindrical lens 12 has a cylindrical front surface and a planar rear surface. The first surface of the scanning lens 21 and the second surface of the field curvature correction lens 22 have rotational symmetry.

The second surface of the scanning lens 21 is an anamorphic aspherical surface. The coefficients of the equations (5) and (6) specifying the particular shape of the second surface of the scanning lens 21 of the comparative example 2 will be shown in the following TABLE 11.

TABLE 11

| K | 0.00E+00 | | |
|---|---|---|---|
| $AM_1$ | 0.00E+00 | $AS_1$ | 8.56E-06 |
| $AM_2$ | 0.00E+00 | $AS_2$ | -1.82E-06 |
| $AM_3$ | 0.00E+00 | $AS_3$ | -3.44E-09 |
| $AM_4$ | 1.88E-07 | $AS_4$ | -9.08E-10 |
| $AM_5$ | 0.00E+00 | $AS_5$ | 4.12E-11 |
| $AM_6$ | -1.87E-12 | $AS_6$ | -3.91E-13 |
| $AM_7$ | 0.00E+00 | $AS_7$ | -3.33E-14 |
| $AM_8$ | 1.13E-15 | $AS_8$ | 0.00E+00 |

The first surface of the field curvature correction lens 22 is a two dimensional polynomial aspherical surface. The coefficients of the equation (7) specifying the particular shape of the first surface of the field curvature correction lens 22 of the comparative example 2 will be shown in the following TABLE 12.

TABLE 12

| | $B_{Z0}$ | $B_{Z1}$ | $B_{Z2}$ | $B_{Z3}$ | $B_{Z4}$ |
|---|---|---|---|---|---|
| $B_{Y0}$ | | 1.367E-02 | 1.809E-02 | 5.971E-06 | -1.710E-06 |
| $B_{Y2}$ | -8.984E-05 | -2.786E-06 | -4.458E-07 | -2.245E-09 | -1.799E-10 |
| $B_{Y4}$ | 1.001E-07 | -2.397E-10 | 2.074E-12 | -3.682E-14 | -2.984E-14 |
| $B_{Y6}$ | -3.700E-12 | 3.139E-14 | 1.141E-15 | -1.209E-16 | 0.000E+00 |
| $B_{Y8}$ | 5.485E-17 | -1.525E-18 | 0.000E+00 | 0.000E+00 | 0.000E+00 |

Coefficients extracted from the above numerical data of the comparative example 2 to be substituted into the condition (3) are as follows:

$H = 4.0$ mm
$\beta = 0.0617$ rad
$D = -45.42$ mm
$N = 1.48617$
$Rz_1 = -185.60$ mm
$Rz_2 = -300.00$ mm Substituting the coefficients into the condition (3) gives 2.0>5.01 (incorrect), that is, the condition (3) is not satisfied in the comparative example 2.

Incidentally, the radii Rz of curvatures of the first and second surfaces of the scanning lens 21 in the auxiliary scanning direction which are shown in Table 10 are paraxial radii of curvatures, that is, the radii of curvatures for a laser beam that forms a spot on the scan target surface S at a position corresponding to an image height Y=0 mm; however, the condition (3) maybe satisfied at any position within the scan width. For example, the curvature radius $Rz_2$ of the second surface of the scanning lens 21 in the auxiliary scanning direction for a laser beam that forms a spot on the target surface S at a position corresponding to an image height Y=110 mm is calculated as:

$Rz_2 = -212.47$ mm

The first surface of the scanning lens 21 has a constant radius of curvature since it is a spherical surface. Substituting the coefficients (in the case of the laser beam forming the spot at the position of the image height Y=110 mm) into the condition (3) gives 2.0>4.49 (incorrect), that is, the condition (3) is not satisfied also in this case of the image height Y=110 mm.

Since the condition (3) regarding the first and second surfaces of the scanning lens 21 is not satisfied in the comparative example 2, the ghost light from the second surface of the scanning lens 21 passes above the polygon mirror 13 and reaches none of its reflecting surfaces as shown in FIGS. 9 and 10. The ghost light does not reenter the scanning lens 21 and no ghost is caused on the target surface S. Therefore, the second surface of the scanning lens 21 is not designated as the object of the anti-reflection coating and thereby costs for the anti-reflection coating can be saved.

As set forth hereinabove, in the manufacturing method of the scanning optical system in accordance with the present invention, out of lens surfaces of imaging lenses used for the scanning optical system, surfaces that can generate and reflect ghost light in harmful directions (with the ghost light reaching a reflecting surface of the polygon mirror 13 and reentering the imaging lenses) are selected, and the anti-reflection coating is provided only to the selected lens surfaces. Therefore, manufacturing costs of the scanning optical system can be reduced while realizing the reduction of the ghost caused by reflection of the laser beam on the lens surfaces.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2002-240410, filed on Aug. 21, 2002, which is expressly incorporated herein by reference in its entirety.

What is claimed is:

1. A manufacturing method of a scanning optical system including a light source for emitting a laser beam, a polygon mirror for scanning the laser beam in a main scanning direction by reflecting the laser beam with reflecting surfaces while revolving around its central axis in a fixed direction, and an imaging optical system including a plurality of lens surfaces for converging the laser beam reflected and scanned by the polygon mirror on a target surface, the method comprising:

determining whether a following conditions (1) is satisfied:

$$H/2 > |2\beta D(D-Rz_1)/Rz_1| \qquad (1)$$

where, "H" denotes a width of each reflecting surface of the polygon mirror in an auxiliary scanning direction perpendicular to the main scanning direction, "β" denotes an incident angle [radian] of the laser beam on the reflecting surface of the polygon mirror in the auxiliary scanning direction, "D" denotes a distance between the reflecting surface of the polygon mirror and a first lens surface at the front end of the imaging optical system, and "$Rz_1$" denotes a radius of curvature of the first lens surface in the auxiliary scanning direction; and forming anti-reflection coating on the first lens surface only when the condition is satisfied.

2. The manufacturing method of a scanning optical system according to claim 1, wherein the imaging optical system includes a scanning lens having the first lens surface and a field curvature correction lens being placed between the scanning lens and the target surface, wherein either lens surface of the scanning lens is formed as an anamorphic aspherical surface, and wherein either lens surface of the field curvature correction lens is formed as a two dimensional polynomial aspherical surface.

3. The manufacturing method of a scanning optical system according to claim 1, wherein a plurality of the laser beams are incident on the reflecting surface of the polygon mirror from directions that are inclined in the auxiliary scanning direction.

4. The manufacturing method of a scanning optical system according to claim 3, wherein the directions of the incident laser beams inclined in the auxiliary scanning direction are set to be symmetrical with respect to an optical axis of a scanning lens having the first lens surface.

5. The manufacturing method of a scanning optical system according to claim 1, wherein the forming anti-reflection coating on a first lens surface forms the anti-reflection coating on the first lens surface only when the following condition (2), in addition to the condition (1), is satisfied:

$$|W| \leq f[(4\pi/P)+\alpha+(2a(Ry_1-D)/Ry_1)] \quad (2)$$

where, $|a| \leq W/f$, "W" denotes a maximum image height in a scanning range on the scan target surface, "f" denotes a total focal length of the imaging optical system, "P" denotes the number of the reflecting surfaces of the polygon mirror, "α" denotes an angle of the laser beam incident on the polygon mirror relative to an optical axis of the imaging optical system measured in the main scanning direction [radian], "a" denotes a swing angle of the laser beam reflected by the polygon mirror relative to the optical axis of the imaging optical system measured in the main scanning direction [radian], and "$Ry_1$" denotes a curvature radius of the first lens surface in the main scanning direction.

6. The manufacturing method of a scanning optical system according to claim 5, wherein the imaging optical system includes a scanning lens having the first lens surface and a field curvature correction lens being placed between the scanning lens and the target surface, wherein either lens surface of the scanning lens is formed as an anamorphic aspherical surface, and wherein either lens surface of the field curvature correction lens is formed as a two dimensional polynomial aspherical surface.

7. The manufacturing method of a scanning optical system according to claim 5, wherein a plurality of the laser beams are incident on the reflecting surface of the polygon mirror from directions that are inclined in the auxiliary scanning direction.

8. The manufacturing method of a scanning optical system according to claim 7, wherein the directions of the incident laser beams inclined in the auxiliary scanning direction are set to be symmetrical with respect to an optical axis of a scanning lens having the first lens surface.

9. A manufacturing method of a scanning optical system including a light source for emitting a laser beam, a polygon mirror for scanning the laser beam in a main scanning direction by reflecting the laser beam with reflecting surfaces formed on its lateral faces while revolving around its central axis in a fixed direction, and an imaging optical system including a plurality of lens surfaces for converging the laser beam reflected and scanned by the polygon mirror on a target surface, the method comprising:

determining whether a following condition (3) is satisfied:

$$H/2 > |\beta D(D-Lz)/Lz| \quad (3)$$

where, $Lz = Rz_1 Rz_2 D/(2NRz_1 D - 2(N-1)Rz_2 D - Rz_1 Rz_2)$, "H" denotes a width of each reflecting surface of the polygon mirror in an auxiliary scanning direction perpendicular to the main scanning direction, "β" denotes an incident angle [radian] of the laser beam on the reflecting surface of the polygon mirror in the auxiliary scanning direction, "D" denotes a distance between the reflecting surface of the polygon mirror and a first lens surface at the front end of the imaging optical system, "$Rz_1$" denotes a curvature radius of the first lens surface in the auxiliary scanning direction, "$Rz_2$" denotes a curvature radius of a second lens surface next to the first lens surface in the auxiliary scanning direction, and "N" denotes a refractive index of a medium between the first lens surface and the second lens surface for the laser beam; and forming anti-reflection coating on the second lens surface of the imaging optical system only when the condition is satisfied.

10. The manufacturing method of a scanning optical system according to claim 9, wherein the imaging optical system includes a scanning lens having the first lens surface and a field curvature correction lens being placed between the scanning lens and the target surface, wherein either lens surface of the scanning lens is formed as an anamorphic aspherical surface, and wherein either lens surface of the field curvature correction lens is formed as a two dimensional polynomial aspherical surface.

11. The manufacturing method of a scanning optical system according to claim 9, wherein a plurality of the laser beams are incident on the reflecting surface of the polygon mirror from directions that are inclined in the auxiliary scanning direction.

12. The manufacturing method of a scanning optical system according to claim 11, wherein the directions of the incident laser beams inclined in the auxiliary scanning direction are set to be symmetrical with respect to an optical axis of a scanning lens having the first lens surface.

13. The manufacturing method of a scanning optical system according to claim 9, wherein the forming anti-reflection coating on a second lens surface forms the anti-reflection coating on the second lens surface only when the following condition (4), in addition to the condition (3), is satisfied:

$$|W| \leq f[(4\pi/P)+\alpha+(a(Ly-D)/Ly)] \quad (4)$$

where, $|a| \leq W/f$, $Ly = Ry_1 Ry_2 D/(2NRy_1 D - 2(N-1)Ry_2 D - Ry_1 Ry_2)$, "W" denotes a maximum image height in a scanning range on the scan target surface, "f" denotes a total focal length of the imaging optical system, "P" denotes the number of the reflecting surfaces of the polygon mirror, "α" denotes an angle of the laser beam incident on the polygon mirror relative to an optical axis of the imaging optical system measured in the main scanning direction [radian], "a" denotes a swing angle [radian] of the laser beam reflected by the polygon mirror relative to the optical axis of the imaging optical system measured in the main scanning direction, "$Ry_1$" denotes a curvature radius of the first lens surface in the main scanning direction, and "$Ry_2$" denotes a curvature radius of the second lens surface in the main scanning direction.

14. The manufacturing method of a scanning optical system according to claim 13, wherein the imaging optical system includes a scanning lens having the first lens surface and a field curvature correction lens being placed between the scanning lens and the target surface, wherein either lens surface of the scanning lens is formed as an anamorphic aspherical surface, and wherein either lens surface of the field curvature correction lens is formed as a two dimensional polynomial aspherical surface.

15. The manufacturing method of a scanning optical system according to claim 13, wherein a plurality of the laser beams are incident on the reflecting surface of the polygon mirror from directions that are inclined in the auxiliary scanning direction.

16. The manufacturing method of a scanning optical system according to claim 15, wherein the directions of the incident laser beams inclined in the auxiliary scanning direction are set to be symmetrical with respect to an optical axis of a scanning lens having the first lens surface.

* * * * *